United States Patent [19]
Andu

[11] Patent Number: 6,131,333
[45] Date of Patent: Oct. 17, 2000

[54] AUTOMATIC PLANT WATERING APPARATUS

[76] Inventor: Adedamola Adebayo Andu, 69 Harrowdene Road, North Wembley Middlesex HA0 2JQ, United Kingdom

[21] Appl. No.: 09/122,486

[22] Filed: Jul. 24, 1998

[51] Int. Cl.[7] .................................................. A01G 27/06
[52] U.S. Cl. ....................................................................... 47/81
[58] Field of Search ................................. 47/79, 80, 81, 47/59, 48, 5

[56] References Cited

U.S. PATENT DOCUMENTS

| 3,049,834 | 8/1962 | Heath | 47/81 |
|---|---|---|---|
| 4,557,071 | 12/1985 | Fah | 47/81 |
| 4,741,125 | 5/1988 | Demorest | 47/81 |
| 4,819,375 | 4/1989 | Baumgartner et al. | 47/80 |
| 4,864,771 | 9/1989 | Fah | 47/79 |
| 4,885,870 | 12/1989 | Fong | 47/79 |
| 5,546,700 | 8/1996 | Kumpf | 47/79 |
| 5,887,383 | 3/1999 | Soeda | 47/59 |

FOREIGN PATENT DOCUMENTS

| 29425 | 8/1907 | Austria | 47/80 |
|---|---|---|---|
| 290755 | 11/1988 | European Pat. Off. | 47/80 |
| 48002 | 2/1980 | France | 47/80 |
| 2631116 | 7/1976 | Germany | 47/80 R |
| 14554 | 12/1907 | United Kingdom | 47/80 |
| 874729 | 8/1961 | United Kingdom | 47/80 |

*Primary Examiner*—Michael J. Carone
*Assistant Examiner*—Son T. Nguyen
*Attorney, Agent, or Firm*—Bryan Cave, LLP

[57] ABSTRACT

An automatic plant watering apparatus is described in which a plant's growing medium is maintained uniformly moist. A one-piece water-holding body used in conjunction with a moisture-sensitive valve. The water-holding body includes a central filling chamber flanked by two reservoir chambers. A continuous air duct surrounds the periphery of the two-reservoir chambers and filling chamber. One end of the duct is coupled to a capillary plug which operates as a moisture-sensitive valve. By controlling the conducting of air ambient pressure is utilized to regulate the flow of water from the reservoirs into the planting medium.

15 Claims, 2 Drawing Sheets

AUTOMATIC PLANT WATERING APPARATUS

FIELD OF THE INVENTION

This invention pertains to a watering apparatus for plants.

BACKGROUND OF THE INVENTION

A plant, and particularly but not exclusively a potted plant, needs a regular supply of water for healthy growth. The rate at which water must be supplied is dependent upon a number of factors, including the type and size of plant and environmental conditions. To maintain the plant in a healthy state, watering must be carried out with a frequency and in a quantity to maintain the plant's growing medium correctly moist. A sudden change in environmental conditions can lead to over or under watering. Should watering be forgotten, the growing medium could dry out causing the death of the plant.

There is, therefore, a demand for a device which can be entrusted to water a plant automatically, and various such devices have been proposed. A variety of such devices is described in the prior art, which includes WO 95/10934 and the prior art cited in the Search Report published with that document. In principle, these known devices rely upon a moisture-sensitive air valve (e.g. a porous plug), which is in communication with the growing medium, to admit air to an otherwise-sealed reservoir for controlling the dispensing of water to the medium. Whilst such devices can work well, few if any have reached the market with success, owing not least to the complexity and cost of their construction.

It is an aim of the present invention to provide self watering apparatus of improved construction.

SUMMARY OF THE INVENTION

The invention provides, in one of its aspects, automatic watering apparatus for maintaining a plant growing medium suitably moist, the apparatus comprising a water-holding body moulded in one piece and forming:

(i) a filling chamber, a filling opening at a high level in the chamber through which water can be introduced into the chamber, and a delivery port at a low level in the chamber;

(ii) a reservoir chamber, a filling port at a low level of the chamber which is in communication with the delivery port of the filling chamber so that water can pass from the filling chamber into the reservoir chamber, a bleed orifice at a low level in the chamber through which the water can be discharged, and a venting port at a high level in the chamber through which air can be drawn into the chamber under the control of a moisture-sensitive valve of the apparatus; and (iii) a watering chamber positioned at a low level relative to the reservoir chamber to receive water from the reservoir chamber through the bleed orifice, and a discharging orifice through which water can be discharged from the chamber for delivery to the growing medium.

In accordance with the principles of the invention, the body may be of a plastics material and may be formed by injection moulding or blow moulding.

Further in accordance with the invention, a pressure-relieving duct may connect the reservoir chamber at a high level to the filling chamber or watering chamber at a low level whereby air can be discharged from the reservoir chamber during replenishment from the filling chamber, the outlet of the duct being below water level during normal operation of the device to seal the duct against air being drawing through it into the reservoir chamber.

In a preferred construction the pressure-relieving duct connects the reservoir chamber to the watering chamber. The discharging orifice from the watering chamber is preferably positioned above the bottom of the chamber and the duct arranged to enter the chamber at a level below the orifice in order that it is normally below the water level in the chamber.

A reservoir venting duct may be an integral part of the unitary moulded body, extending to the venting port associated with the reservoir chamber from the moisture-sensitive valve which controls the admission of air to the chamber.

The body may conveniently form two reservoir chambers which are arranged on opposite sides of the filling chamber to receive water from the filling chamber. A continuous duct may extend around the periphery of a compartmented block forming the filling and reservoir chambers, so as to provide both venting and pressure-relieving ducts.

The apparatus compensates automatically for conditions where more or less water must be supplied to the growing medium. For example, it increases the flow when the growing medium is being dried by ambient heat or wind.

Preferably, the flow of water from the discharging port is such as to provide sufficient water to the growing medium without allowing excess water to leave the reservoir. The discharging port may comprise a small hole in a wall of the watering chamber, control of the flow of water through the hole being achieved by control of the air pressure in the reservoir chamber.

BRIEF DESCRIPTION OF THE DRAWING

There now follows a description, to be read with reference to the accompanying drawings, of an embodiment which illustrates the invention by way of example, and in which.

DETAILED DESCRIPTION

Figure 1:
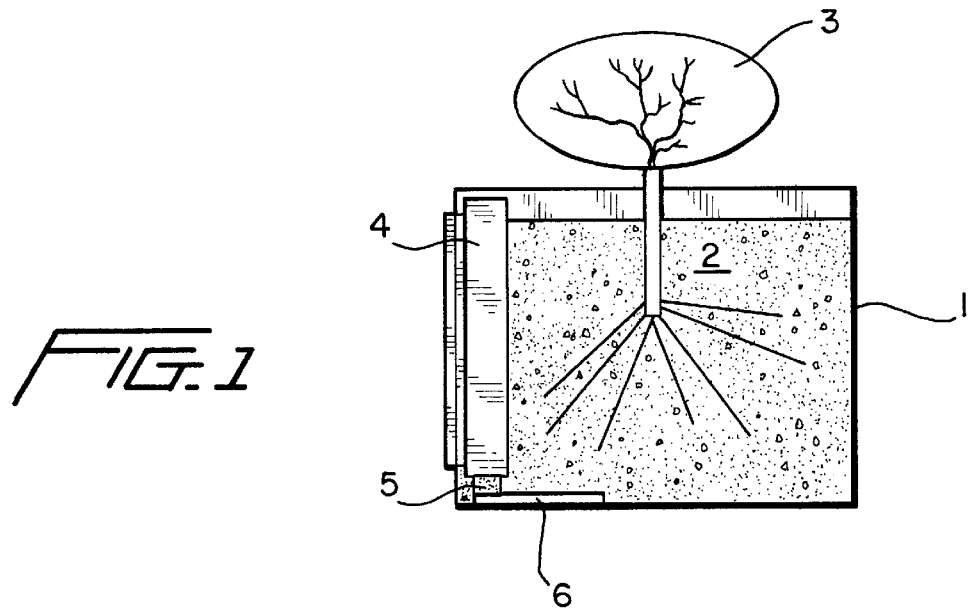
FIG. 1 is a view of a plant pot fitted with an automatic watering device.

With reference to FIG. 1, a plant pot 1 is filled with a growing medium 2, such as a suitable compost, for a plant 3. A watering device 4 is installed inside pot 1 against one wall of pot 1. Device 4 comprises a capillary plug 5 which is held within the growing medium in contact with a capillary mat 6 lying on the bottom of pot 1; the mat 6 extends towards the center of pot 1 from the plug 5.

Figure 2:
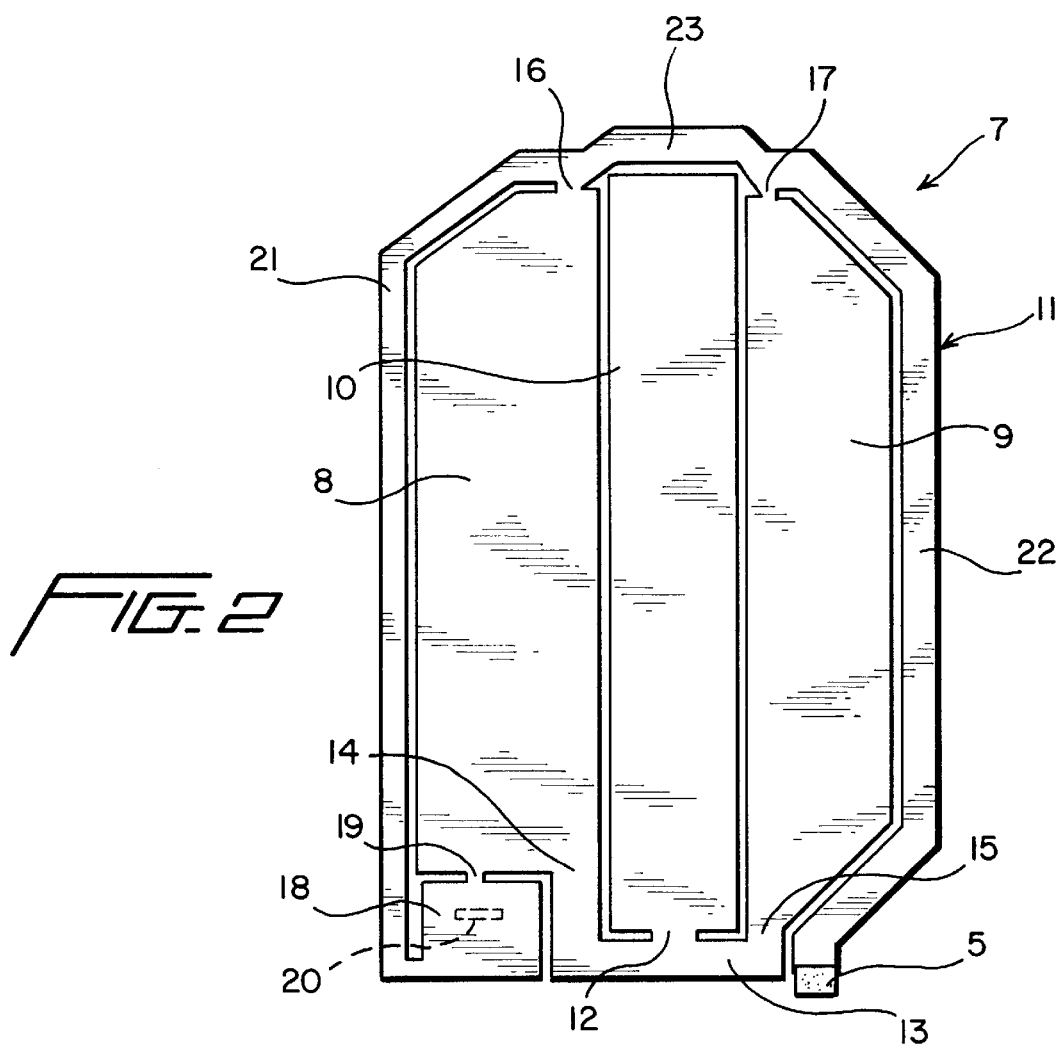
FIG. 2 is an elevational diagrammatic view of a first embodiment of the device of FIG. 1.

Turning to FIG. 2, the watering device comprises a water-holding body 7 which has been blow-moulded in one piece of a suitable plastics material. Body 7 is a generally rectangular flattish block which is compartmented to form two reservoir chambers 8,9 arranged on opposite sides of a central filling chamber 10. A continuous air duct 11 extends around the periphery of the block. The capillary plug 5 is shown inserted into an open end of the duct 11 adjacent to a base of the block, the block being shown in its normal upright orientation.

A filling opening (not shown) at (or adjacent to) the top of the filling chamber 10 permits water to be introduced into chamber 10. A delivery port 12 at the bottom of chamber 10 allows the water to flow from filling chamber 10 into the two reservoir chambers 8,9 via a distribution duct 13 at the base of the block and filling ports 14,15 into the reservoir chambers. As the water level rises in the reservoir chambers, air escapes into the air duct 11 from the chambers 8,9 through high level venting ports 16,17 as hereinafter described in more detail.

The moulded body 7 forms also a watering chamber 18 which is positioned at the base of the block adjacent to the distribution duct 13, being located immediately beneath one of the reservoir chambers 8. The watering chamber 18 is so arranged to receive water from the reservoir chamber 18 through a fine bleed orifice 19. At a level well above the bottom of the watering chamber, a discharging orifice 20 allows water to be discharged from the chamber for delivery to the growing medium.

The air duct 11 fulfils two functions. As referred to hereinbefore, an open end of the duct is plugged by means of the capillary plug 5. The other end of the duct 11 leads into the watering chamber 18 at a level below the discharging orifice 20, and so below the normal water level in the chamber. That part 21 of the duct 11 extending from the reservoir venting ports 16,17 to the watering chamber 18 serves as a pressure-relieving duct whereby air can be discharged from the reservoir chambers 8,9 during replenishment. The outlet end of the duct 21 being below the water level in the watering chamber, 18 that end is sealed against air being drawn through the duct into the reservoir chambers.

Air can be drawn into the reservoir chambers 8,9 through the other part 22 of the air duct, 11 extending as a venting duct between the venting ports 16,17 and the capillary plug 5, under the control of the plug 5. The plug 5 serves as a moisture-sensitive valve, allowing atmospheric air to be drawn into the reservoir chambers 8,9 when dry but preventing the passage of air when wet.

It is observed that what have been described as the pressure-relieving and venting parts 21,22 of the duct 11 share use of a linking portion 23 of the duct 11 which is in communication with the reservoir venting ports 16,17.

The device is designed to be placed inside the plant pot 1 with the capillary plug 5 resting on the capillary mat 6 at the bottom of the plant pot and surrounded by the planting medium compost 2. Water is poured into the filling chamber 10. As the water passes through the filling ports 14,15 air trapped in the chambers 8,9 escapes via the pressure-relieving duct 21 into the watering chamber 18; this chamber is vented by means of the discharging orifice 20. Simultaneously, water enters the watering chamber through the bleed orifice 19, to overflow on to the capillary mat 6 once the level in the chamber reaches the discharging orifice.

While the mat 6 in contact with the plug 5 is dry, air will enter the venting duct 22 (via the capillary plug) to replace the water draining from the reservoirs 8,9. However, when the mat 6 becomes saturated, the wet capillary plug 5 effectively seals against ingress of air into the duct. Thus as water continues to flow from the device, pressure in the reservoirs decreases. This has two effects: firstly, water from the mat 6 is pushed upwards within the venting duct by ambient pressure; and secondly flow from the device eventually ceases, its being prevented by ambient pressure once the pressure in the reservoirs 8,9 drops below a threshold level.

From the above it will be appreciated that an initially dry mat 6 is quickly wetted to supply water to the plant 3. Then, equilibrium is reached and flow of water substantially stops.

Further to this, the growing medium 2 will slowly draw water from the mat 6 to replace water consumed by the plant 3 and lost through evaporation. This water will be replaced by the water previously pushed up into the venting duct. The result of this flow of water from the duct is that the pressure within the reservoirs 8,9 is further reduced. Eventually the decrease in the pressure combined with the reduction of the sealing effect due to the reduced head of water in the duct and the reduction of water content of the plug 5, causes the seal to break. Air entering the venting duct rises into the reservoir chambers 8,9 causing an increase in pressure therein. Eventually, the pressure will rise to such an extent that water can once more flow out of the device. The process of wetting of the capillary plug 5 and mat 6 is thus repeated, and continues in cycles.

Figure 3:
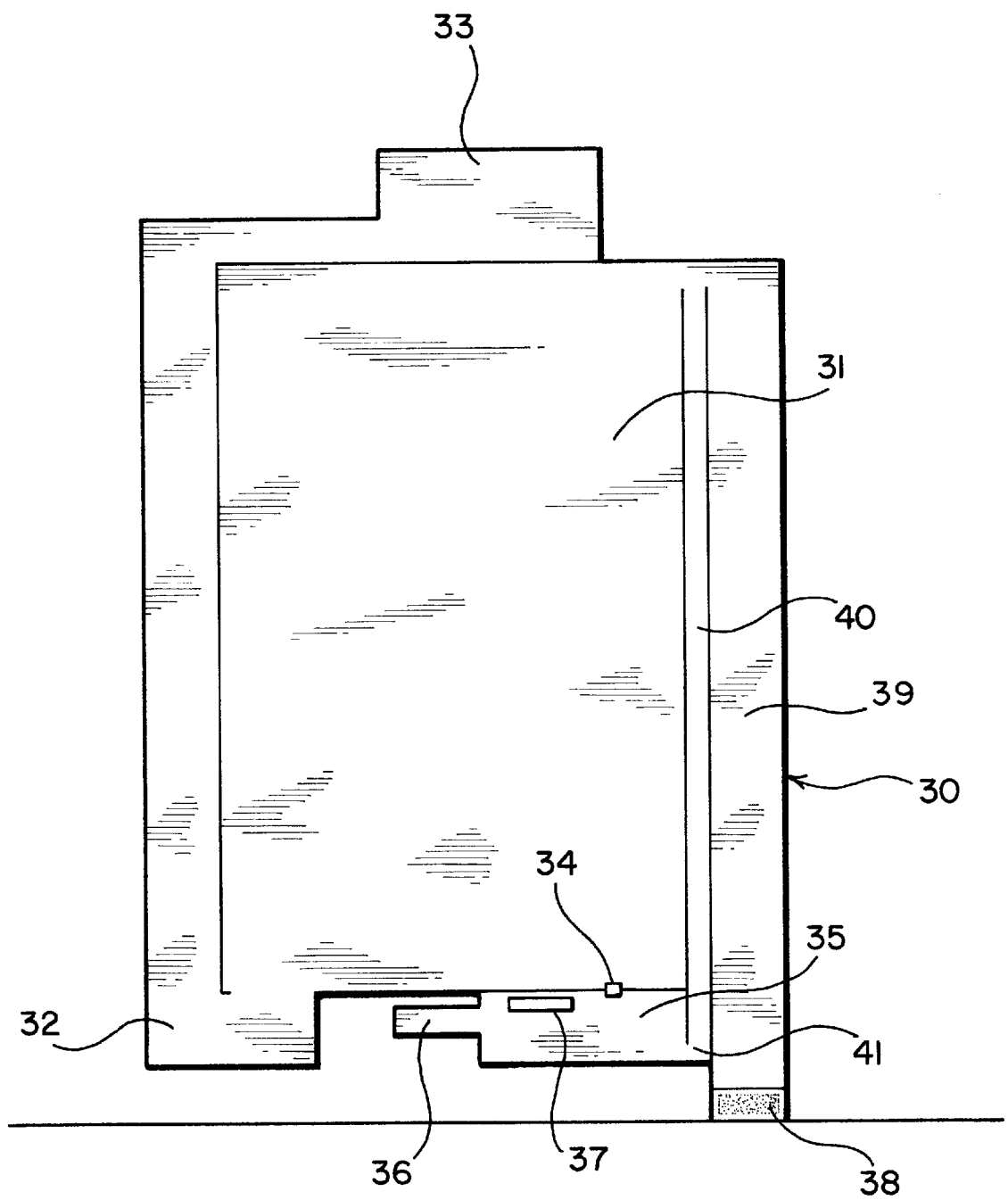
FIG. 3 is a similar view of a second embodiment of the device of FIG. 1.

In FIG. 3, there is shown a watering device comprising a water-holding body 30, having a single reservoir chamber 31 which is arranged on one side of a filling chamber 32. The filling chamber 32 is filled at a filling port 33.

In use, the water is poured into chamber 31 via filling port 33 and filling chamber 32. As water continues to fill chamber 31, water simultaneously enters chamber 35 through hole 34. As the water flow continues, overflow takes place via tube 36 or hole 37 into the atmosphere, coming into contact with capillary plug 38. The plug 38 seals tube 39, which is open to the top of chamber 31.

The increase in water level in chamber 31 causes air to be forced into tube 40, which is open to the top of chamber 31 and to the bottom of chamber 35, at 41. Escaping air is vented to the atmosphere via tube 36 or hole 37.

Once the filling is complete, the top of chamber 31 is still open to atmospheric pressure, via tube 39, causing water to be released from chamber 31, via hole 34 and into chamber 35, subsequently overflowing via tube 36 or hole 37. The drop in water level in chamber 31 causes water to be pulled up tube 39 via capillary plug 38 and to be pulled up tube 40 via opening 41. This ingress of water creates a partial vacuum in chamber 31 and reduces the rate of flow of water through hole 34. When an equilibrium height is reached between the water levels in chamber 31 and in tubes 39 and 40, the flow ceases.

Capillary plug 38 is in contact with the growing medium, the capillary action of which draws water from the tube 39 via the plug 38.

What is claimed is:

1. Automatic watering apparatus for maintaining a plant growing medium suitably moist, said apparatus comprising:
    a moisture-sensitive valve; and a water-holding body molded in one piece, wherein said water-holding body comprises:
    (i) a filling chamber comprising a filling opening disposed at a high level in said filling chamber through which water can be introduced into said filling chamber and a delivery port disposed at a low level in said filling chamber;
    (ii) a reservoir chamber comprising:
        (a) a filling port at a low level in said reservoir chamber, said filling port being in communication with said delivery port of said filling chamber so that water can pass from said filling chamber into said reservoir chamber;
        (b) a bleed orifice at a low level in said reservoir chamber through which water can be discharged from said reservoir chamber;
        (c) a venting port at a high level in said reservoir chamber through which air can be drawn into said reservoir chamber under control of said moisture-sensitive valve; and (iii) a watering chamber positioned at a low level relative to said reservoir chamber to receive water from said reservoir chamber through said bleed orifice, said watering chamber comprising a discharge orifice through which water can be discharged from said watering chamber for delivery to said growing medium.

2. The apparatus of claim 1, wherein: said water-holding body comprises a plastics material.

3. The apparatus of claim 2, wherein:
said water-holding body is blow molded.

4. The apparatus of claim 2, wherein:
said water-holding body is injection molded.

5. The apparatus of claim 1, comprising:
a pressure-relieving duct, said pressure relieving duct connecting said reservoir chamber at a high level to said filling chamber and connecting said reservoir chamber to said watering chamber at a low level whereby air can be discharged from said reservoir chamber during replenishment from said filling chamber, said ducting having an outlet of being below water level during normal operation of said apparatus to seal said duct against air being drawn through it into said reservoir chamber.

6. The apparatus of claim 3, wherein:
said discharge orifice is positioned above the bottom of said watering chamber and said pressure relieving duct is arranged so as to enter said watering chamber at a level below said discharge orifice such that it is normally below the water level in said watering chamber.

7. The apparatus of claim 1, comprising:
a reservoir venting duct integral with said water-holding body, said reservoir venting duct extending to said venting port of said reservoir chamber from said moisture-sensitive valve.

8. The apparatus of claim 1, wherein:
said water-holding body comprises first and second reservoir chambers, each arranged on opposite sides of said filling chamber to receive water from said filling chamber.

9. The apparatus of claim 1, comprising:
a continuous duct which extends around the periphery of said water holding body, said continuous duct being open to said venting port of said reservoir chamber and extending from said moisture-sensitive valve to an outlet below a normal water level in said filling chamber and said watering chamber.

10. The apparatus of claim 1, wherein:
said water-holding body has a single reservoir chamber which is arranged on one side of said filling chamber to receive water from said filling chamber.

11. A water-holding body molded in one piece and suitable for use in automatic watering apparatus for maintaining a plant growing medium suitably moist, said water-holding body comprising:

(i) a filling chamber having a filling opening and a delivery port, said filling opening at a high level in said chamber through which water can be introduced into said chamber and said delivery port at a low level in said chamber;

(ii) a reservoir chamber having:

(a) a filling port at a low level in said chamber, said filling port being in communication with said delivery port of said filing chamber so that water can pass from said filling chamber into said reservoir chamber;

(b) a bleed orifice at a low level in said reservoir chamber through which water can be discharged from said reservoir chamber;

(c) a venting port at a high level in said reservoir chamber through which air can be drawn into said reservoir chamber under the control of a moisture-sensitive valve provided in said apparatus;

(d) a watering chamber positioned at a low level relative to said reservoir chamber to receive water from said reservoir chamber through said bleed orifice, said watering chamber having a discharge orifice through which water can be discharged from said watering chamber for delivery to said growing medium.

12. The water-holding body of claim 11, wherein:
said body is made of a plastic material.

13. The water-holding body of claim 10, wherein:
said body is injection molded.

14. The water-holding body of claim 10, wherein:
said body is blow molded.

15. The water-holding body of claim 11 comprising:
a continuous duct which extends around the periphery of a compartmented block formed by said filling and said reservoir chambers, said continuous duct being open intermediate its ends to said venting port in said reservoir chamber and said duct extending between an opening at one of its ends, through which opening air can be drawn for entry into said reservoir chamber and an outlet at its other end, wherein said outlet opens into said filling chamber and said watering chamber at a low level.

* * * * *